(12) United States Patent
Boudinot

(10) Patent No.: US 7,401,853 B2
(45) Date of Patent: Jul. 22, 2008

(54) VEHICULAR VIDEO SYSTEM

(75) Inventor: Richard Boudinot, Leverkusen (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/748,470

(22) Filed: Dec. 30, 2003

(65) Prior Publication Data

US 2004/0160096 A1   Aug. 19, 2004

Related U.S. Application Data

(62) Division of application No. 10/156,723, filed on May 28, 2002, now Pat. No. 6,698,832.

(30) Foreign Application Priority Data

May 25, 2001   (DE)   ............................. 201 08 701 U
Nov. 28, 2001   (DE)   ............................. 201 19 410 U

(51) Int. Cl.
  *A47C 7/72*   (2006.01)
(52) U.S. Cl. .................................. 297/217.4
(58) Field of Classification Search .................. 40/320, 40/700, 593, 606.8, 403, 404; 16/280; 348/148; 297/217.4, 217.3, 217.1, 408, 463.2, 463.1, 297/216.12; 248/919, 917, 921, 923, 372.1, 248/292.13, 922
See application file for complete search history.

(56) References Cited

U.S. PATENT DOCUMENTS

| | | | |
|---|---|---|---|
| 1,178,107 A * | 4/1916 | Shafer | ........................ 40/320 |
| 2,770,903 A * | 11/1956 | Schmidt | ....................... 40/320 |
| 3,019,050 A | 1/1962 | Spielman | |
| 5,147,109 A | 9/1992 | Jolly | |
| 5,267,775 A | 12/1993 | Nguyen | |
| 5,316,369 A * | 5/1994 | Kanda | .................... 297/188.15 |
| 5,507,556 A | 4/1996 | Dixon | |
| 5,529,265 A * | 6/1996 | Sakurai | ................... 244/118.5 |
| 5,713,633 A | 2/1998 | Lu | |
| 5,842,715 A * | 12/1998 | Jones | ......................... 280/727 |
| 5,906,414 A | 5/1999 | Rus | |
| 6,157,418 A | 12/2000 | Rosen | |
| 6,215,518 B1 | 4/2001 | Watkins | |
| 6,250,967 B1 | 6/2001 | Chu | |
| 6,394,551 B1 | 5/2002 | Beukema | |

* cited by examiner

*Primary Examiner*—Milton Nelson, Jr.
(74) *Attorney, Agent, or Firm*—Foley & Lardner LLP

(57) ABSTRACT

An entertainment system for a vehicle has a display configured such that it may be pivoted with respect to a seat. The display may be configured to be pivoted in either a forward direction or a direction opposite the forward direction. The display may be configured to face both the forward direction of travel and a different direction. The display may also be configured to be pivoted in a direction by generating a first torque, and pivoted farther in that direction by generating a second torque of greater force than the first torque. This may be accomplished by using a damper and a spring. The system may include a braking mechanism, may include a frame where the display is visible through a first side and protected by a second side, and may be pivotable along more than one axis.

22 Claims, 4 Drawing Sheets

VEHICULAR VIDEO SYSTEM

CROSS-REFERENCE TO RELATED APPLICATIONS

The present application is a divisional application of U.S. patent application Ser. No. 10/156,723 filed May 28, 2002, now U.S. Pat. No. 6,698,832 which claims priority to German Application No. 201 19 410.4 filed on Nov. 28, 2001 and German Application No. 201 08 701.4 filed on May 25, 2001 under 35 U.S.C. § 119(a). The disclosures of all three applications are hereby incorporated by reference.

FIELD

The invention concerns a vehicle seat having a headrest detachably fastenable to a seatback, and having an integrated display screen device for which the headrest has a receiving space.

BACKGROUND OF THE DISCLOSURE

In order to offer passengers in a motor vehicle the ability to work or to entertain or inform themselves, it is known to install a display screen device in the region of the headrest of the seatback of a vehicle seat. The display screen device can be, for example, a TV receiver, a video device, or a computer.

Known vehicle seats that fulfill this purpose are described in German Utility Model Applications DE 295 18 369 U1 and DE 296 00 783 U1, and in U.S. Pat. No. 5,529,265. Utility Model DE 296 00 783 U1, for example, discloses a headrest for motor vehicles in which entertainment-sector devices can be integrated into a cavity. The vehicle seat having the headrest described is one of the type described initially.

In the case of the headrest for vehicle seats known from Utility Model DE 295 18 369 U1, there is arranged on the back side of the headrest a display screen that is integrated into a shaped element, removable from the headrest, having a space that is intended for reception of the headrest.

U.S. Pat. No. 5,529,265 describes a vehicle seat in which the integrated display screen device is mounted pivotably in a receiving space of the headrest, although the headrest is not fastened detachably to the seatback of the seat but rather forms a physical unit therewith.

It is the object of the invention to configure a vehicle seat having an integrated display screen device of the kind described initially, using means of simple design, so as to improve its ease of assembly while ensuring maximum comfort and a high level of safety for the vehicle's passengers.

The teachings hereinbelow extend to those embodiments which fall within the scope of the appended claims, regardless of whether they accomplish one or more of the above-mentioned needs.

SUMMARY OF EXEMPLARY EMBODIMENTS

This object is achieved by way of a vehicle seat of the kind cited initially in which in the assembled state, the display screen device is fastened in the receiving space positively and/or nonpositively between the headrest and the seatback.

The vehicle seat is thus, advantageously, very easy to assemble as a result of a modular construction of the headrest, display screen device, and seatback. The positive and/or nonpositive join, which in particular can be a clamped join, can be made sufficiently secure and, if necessary, can be reinforced in additionally securing fashion without thereby negatively affecting the ease of assembly.

This object is furthermore achieved by a vehicle seat of the kind described initially in which at least the display screen of the display screen device is pivotable about an axis extending in the transverse direction of the seat in the upper region of the seatback, and alternatively or additionally is rotatable about a (further) center axis extending in the transverse direction of the seat. The establishment of specific display screen positions thereby made possible allows the safety standard to be raised, and the comfort of the vehicle seat according to the present invention to be improved.

In motor vehicles, the headrest of a vehicle seat is generally guided in vertically displaceable fashion with two retaining rods in guide sleeves that are joined to the frame of the seatback of the vehicle seat. In a preferred embodiment of the invention, for detachable fastening of the display screen device an integral combination of the two guide sleeves, constituted by a bridge and serving as support part for the display screen device, can comprise a receiving opening which is configured in such a way that it can receive a commercially available plug connector for an electrical connection. The contacts of the plug connector can be allocated to supply lines necessary for operation of the display screen device. The entire cable bundle of the connector lines can thus advantageously, in a manner invisible to the passengers, be routed within the seatback and guided to the corresponding supply devices. The necessary electrical connection is then created simultaneously with placement of the display screen device onto the support part.

The display screen, which preferably can be embodied using LCD technology, can advantageously be arranged on an (in particular, flat) bottom part (console) that additionally comprises passthrough holes for passage of the retaining rods of the headrest. The result is to achieve an additional positive immobilization of the display screen device, which thus cannot be removed from its retaining apparatus without removing the headrest.

The receiving space of the headrest for the display screen device can advantageously be configured as a recess that is open on two sides (at the bottom and in the viewing direction of the viewer of the display screen device) and completely surrounds the display screen device, thus also yielding comprehensive impact protection for the passengers sitting in front of the display screen device. Sufficient passenger protection can be guaranteed even if the headrest must be adjusted vertically for purposes of adaptation.

Further advantageous embodiments of the invention are contained in the dependent claims and the following specific description.

BRIEF DESCRIPTION OF THE DRAWINGS

The invention will be explained in more detail with reference to two exemplary embodiments depicted in the appended drawings, in which.

In the various Figures of the drawings, identical parts are always labeled with the same reference characters so that as a rule, they are each also described only once.

DETAILED DESCRIPTION OF EXEMPLARY EMBODIMENTS

Figure 1:
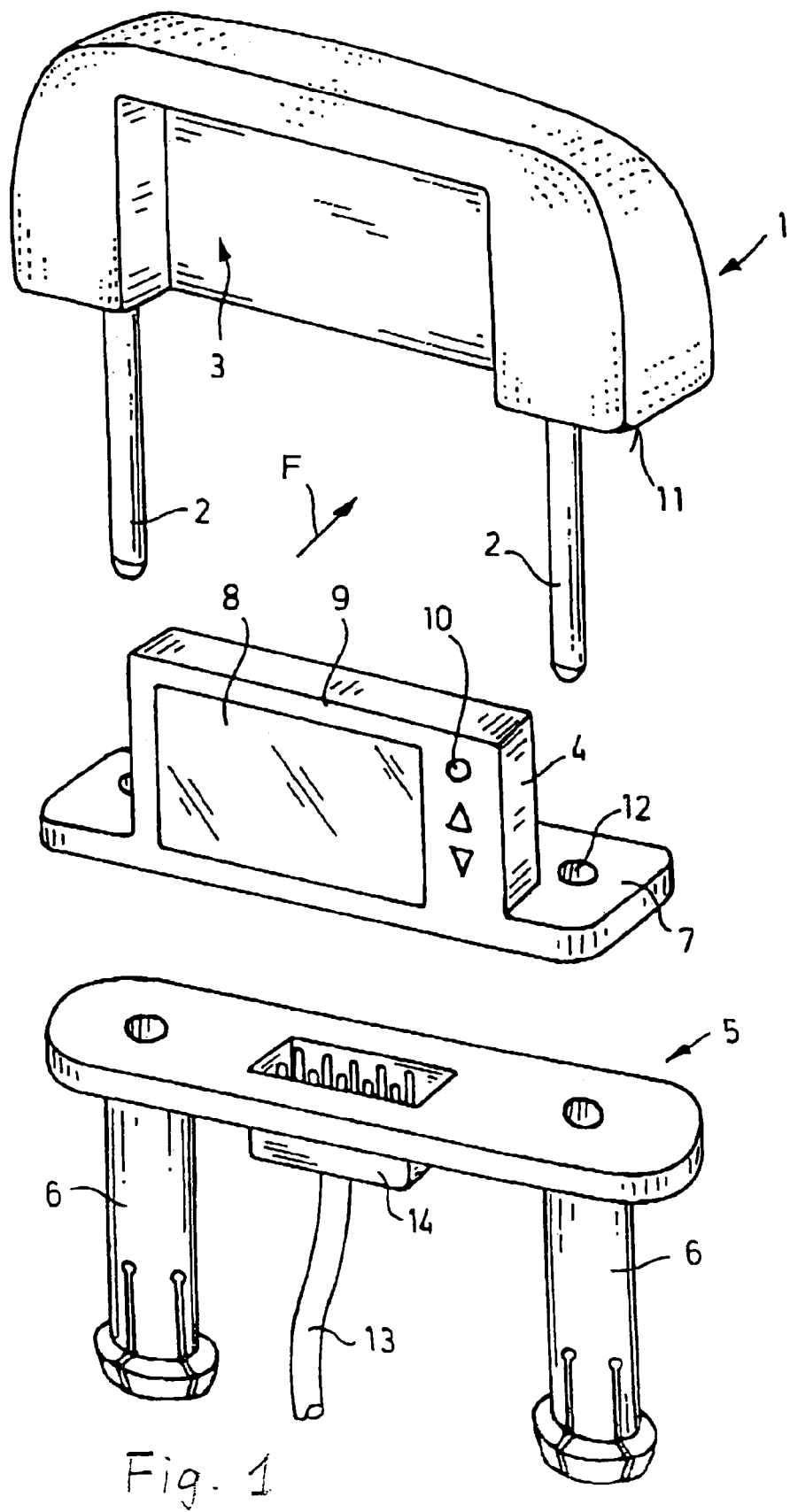
FIG. 1 is an exploded depiction, in perspective, of a first embodiment of a vehicle seat according to an exemplary embodiment.
Figure 2:
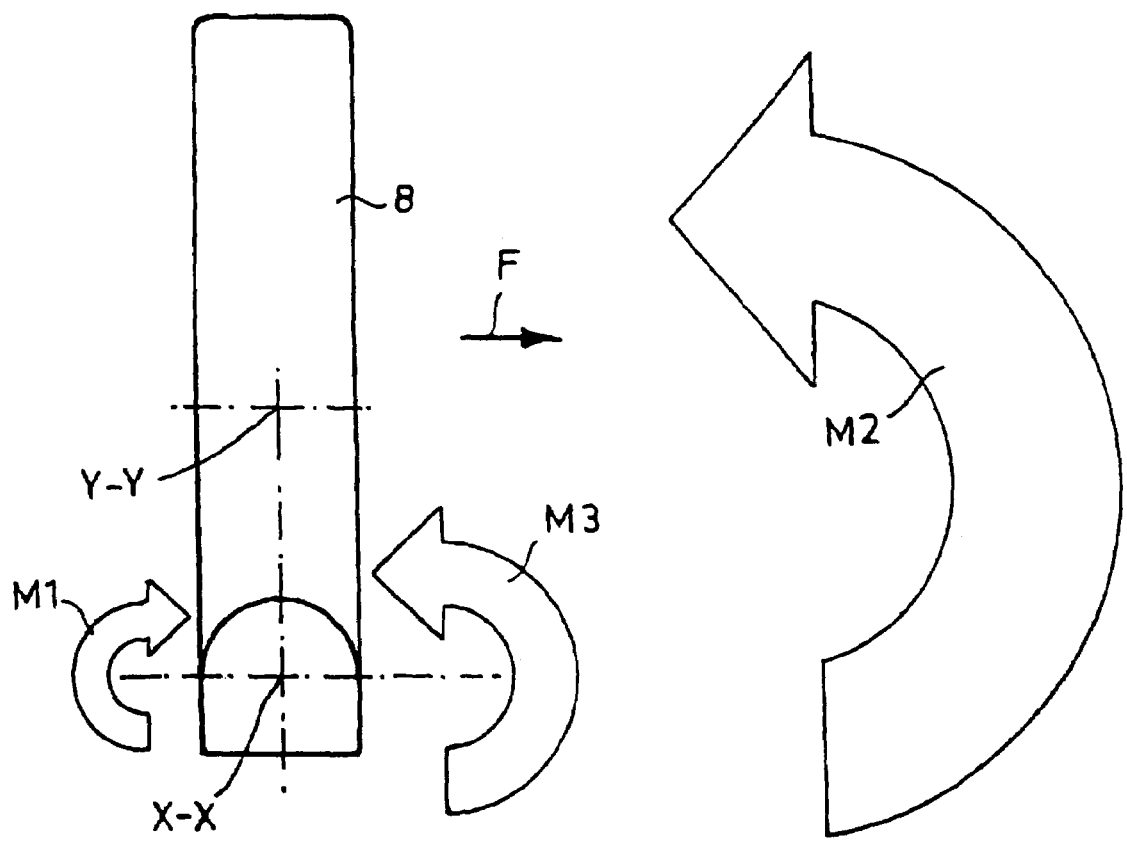
FIG. 2 is a schematic side view of a portion of a second embodiment of a vehicle seat according to an exemplary embodiment.
Figure 3:
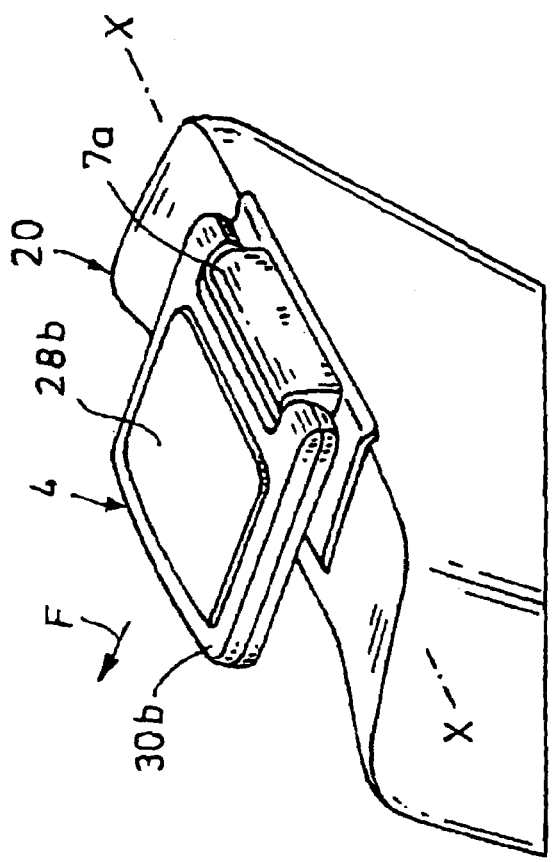
FIGS. 3 and 4 depict, in perspective and in two different positions, the second embodiment of a vehicle seat according to an exemplary embodiment.
Figure 4:
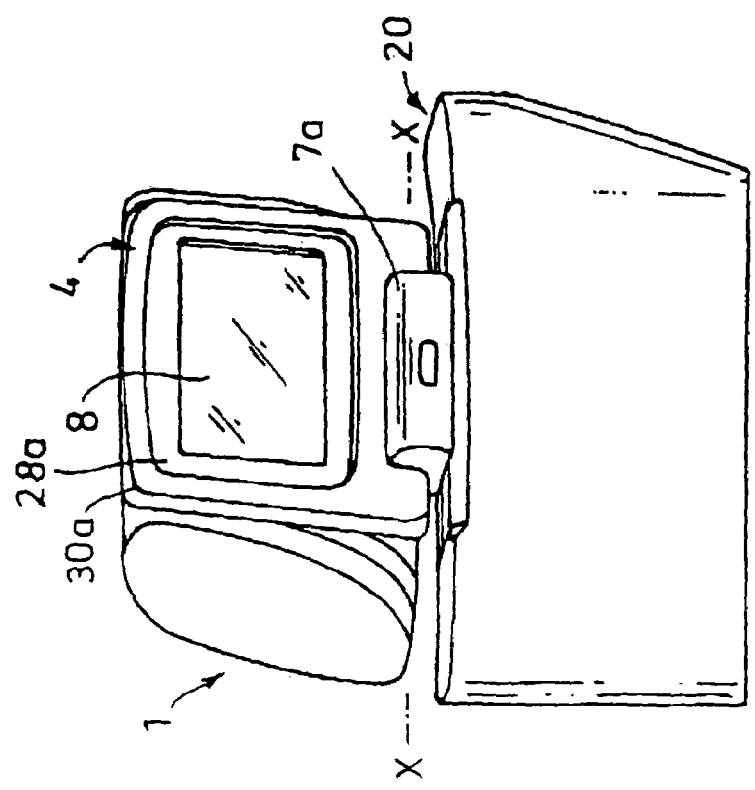

As is apparent firstly from the graphic depiction in FIG. 1 for the first embodiment but also from FIG. 3 for the second embodiment, a vehicle seat according to the present invention comprises a headrest 1 that is detachably fastenable to a seatback 20 (depicted in FIGS. 3 and 4). For that purpose, retaining rods 2 are fastened in known fashion to the underside of headrest 1.

Headrest 1 comprises a receiving space 3 for a display screen device 4 integrated into the vehicle seat according to the present invention. Upon assembly, this display screen device 4 can be fastened in clamping fashion (nonpositively) in receiving space 3 between headrest 1 and seatback 20. Receiving space 3 is advantageously constituted by a recess in headrest 1 that, in the assembled state, positively surrounds display screen device 4 and is open at the front (toward a viewer of display screen 4) and at the bottom (toward seatback 20).

In the embodiment depicted in FIG. 1, seatback 20 has associated with it a support part 5, arranged in an upper part of seatback 20, for display screen device 4. Fastening sleeves 6 for joining seatback 20 to headrest 1, through which retaining rods 2 of headrest 1 pass in the assembled state, are arranged in known fashion in seatback 20. Fastening sleeves 6 are joined in bridge fashion to one another by way of support part 5 for display screen device 4, or are configured integrally with support part 5. Support part 5 with sleeves 6 can advantageously be arranged in a depression of seatback 20 in such a way that it terminates flush with the upper side of seatback 20, e.g. with an upholstered surface of the back, or projects slightly thereabove.

Display screen device 4 comprises a flat bottom part 7 on which display screen 8 is arranged projecting vertically upward. The latter can, in known fashion, be surrounded by a housing 9 in which a suitable keypad 10 for operation of display screen device 4 is located. In an advantageous embodiment, display screen 8 can be a flat display screen, in particular an LCD screen.

For creation of an optimum nonpositive (clamping) connection of display screen device 4 between headrest 1 and seatback 20 of the seat according to the present invention, it is advantageous in this context if the base outline of bottom part 7 is larger than the base outline of display screen 8 (including the base outline of its housing 9), and preferably surrounds said base outline. It is additionally advantageous in this context if the base outline of bottom part 7 corresponds approximately to the base outline of support part 5 in the upper part of the seatback, and approximately to the base outline of a bottom surface 11 of headrest 1. As a result of this base outline configuration, headrest 1 is advantageously supported on bottom part 7, and bottom part 7 on support part 5, over a large area, contributing to optimum clamping.

In a particularly advantageous embodiment of the invention, as already mentioned, passthrough openings 12 for retaining rods 2 of headrest 1 can be arranged in bottom part 7, so that passage of retaining rods 2 through said openings 12 results in additional positive immobilization of display screen device 4. As a result, the clamping connection described above is additionally reinforced and reliability is increased, since display screen 4 can no longer be taken out of the vehicle seat without removing headrest 1.

With regard to the electrical connection or, for example, also the antenna connection of display screen device 4, a plug connector part 14 connected to connector lines 13, for electrical connection to a corresponding plug part (not depicted) of display screen 4 arranged in particular in the base of display screen device 4, can be integrated into support part 5 for display screen device 4. Connector lines 13 of plug connector part 14 can preferably be routed inside seatback 20.

The second embodiment of a vehicle seat according to the present invention illustrated by FIGS. 2 through 5 differs from the first embodiment especially in that at least display screen 8 of display screen device 4 is pivotable about an axis X-X extending in the transverse direction of the seat in the upper region of seatback 20.

Provision can be made in particular for display screen 8 to be pivotable backward, i.e. usually opposite to direction of travel F if the seat is installed correspondingly in the motor vehicle, upon application of a first torque. This is indicated by the arrow labeled M1 in FIG. 2. Torque M1 that is depicted is a resiliently acting return torque which counteracts the pivoting motion and brings the display screen back into its original position. Its magnitude can be small. This kind of pivotability of display screen 8 makes it possible, when headrest 1 has been removed, to bring seatback 20 of the motor vehicle seat according to the present invention into a horizontal position by folding it forward, while preventing display screen 8 from being damaged if it collides in the process with, for example, the dashboard or sun visor.

Provision can furthermore be made for display screen 8 to be pivotable up to 90 degrees forward, i.e. usually in direction of travel F, upon application of a second torque. This is indicated by the arrow labeled M2 in FIG. 2, which symbolizes the resistance to this pivoting motion. When the corresponding torque, which can be eight to ten times the magnitude of the first torque, is exceeded, the display screen folds down into a stable position. This pivotability of display screen 8 represents a misuse prevention feature. The deflecting pivoting of display screen 8, and optionally of further parts joined to it, in response to a large mechanical load prevents display screen 8 or other parts of display screen device 4 from breaking, for example if a passenger inadvertently leans on display screen 8 while exiting. The pivoted position assumed by display screen 8 with headrest 1 removed, which could also be called the "misuse position," is depicted in FIG. 4.

Lastly, provision can be made for display screen 8 to be slightly pivotable (less than 90 degrees) in direction of travel F, in particular upon application of a third torque in the context of the abrupt action of large acceleration forces, such as those that occur in the context of a rear-end impact on the vehicle. This is indicated by the arrow labeled M3 in FIG. 2, which illustrates a damping resistance torque opposite to the pivoting. The corresponding torque can preferably be greater than first torque M1 (e.g. twice as great), but less than second torque M2, as indicated by the differing sizes and thicknesses of the arrows in FIG. 2. This represents a safety feature in a crash situation.

Figure 5:
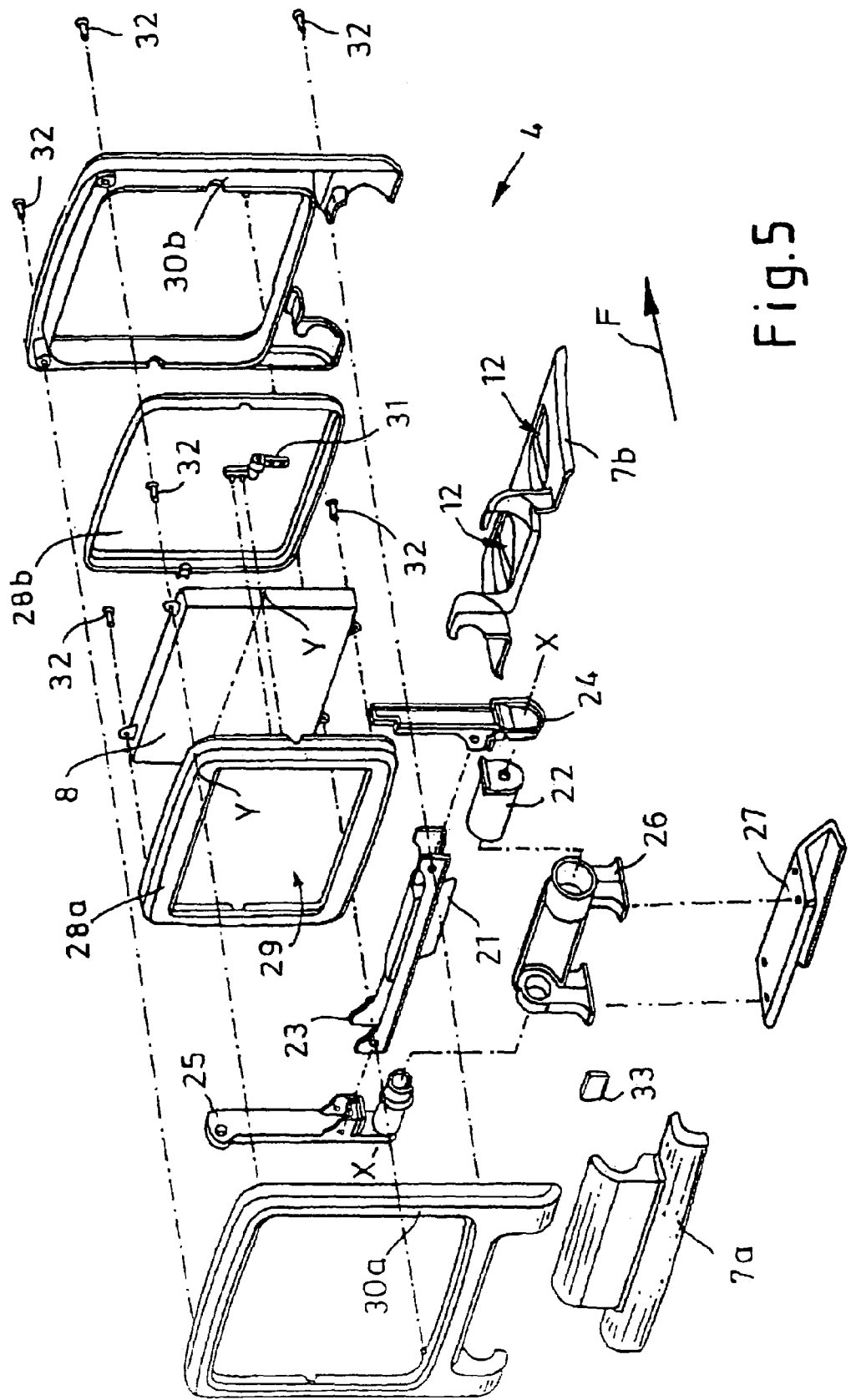
FIG. 5 is an exploded depiction, in perspective, of a display screen device of the second embodiment of a vehicle seat according to an exemplary embodiment.

In order to determine the motion sequence upon pivoting of display screen 8, in particular the forces or torques M1, M2, M3 that initiate and inhibit the pivoting motion, a device that preferably comprises at least one spring member and one damper member can be integrated into display screen device 4. In FIG. 5, for example, a spring 21 is provided as the spring member and a damper 22 as the damper member, located in the assembled state in corresponding associated housing parts, i.e. a spring housing part 23 and damper housing part 24. Spring 21 applies return torque M1, while damper 22 counteracts any pivoting of display screen 8, for example in the event of a crash, while applying torque M3. Spring housing part 23 and damper housing part 24 constitute, together with a further housing part 25 that provides cable guidance, a frame part (not further labeled as a whole) for display screen 8 which is fastened via a base part 26 to an adapter 27 for connection to an upper part of seatback 20. The adapter could also, like part 5 depicted in FIG. 1, be referred to as the support part for display screen device 4.

Corresponding to the flat bottom part 7 of the first embodiment of the invention shown in FIG. 1, FIG. 5 shows the two bottom segments 7a, 7b, of which one (7b) comprises passthrough openings 12 for retaining rods 2 of headrest 1. In the assembled state, bottom segments 7a, 7b surround base part 26 joined to adapter 27, and conceal adapter 27.

The aforementioned axis X-X extending in the transverse direction of the seat in the upper region of seatback 20, about which display screen 8 of display screen 4 is pivotable, is depicted in FIG. 5 as being offset because of the exploded depiction. In the installed state it extends in a straight line, beginning at a lower end of housing part 25 for cable guidance, continuing through base part 26 and damper 22, and ending in damper housing part. 24.

In the installed state, spring housing part 23 is arranged parallel to pivot axis X-X; spring 21 arranged therein can preferably be embodied as a leaf spring and can engage into base part 26.

FIG. 5 furthermore shows that advantageously, at least one cover part, but preferably (as depicted) a front (in terms of direction of travel F) cover part 28b and a rear cover part 28a, can be fastenable to display screen 8 of display screen device 4. Cover parts 28a, 28b are configured in the manner of half shells so they can surround display screen 8. Rear cover part 28a comprises a window 29 through which display screen 8 is visible. Front cover part 28b does not possess a window, but instead protectively covers the back panel of the display screen in the installed state.

In the installed state, display screen 8 is arranged between the two cover parts 28a, 28b and held, together with said parts, in a preferably multi-part frame that corresponds to housing 9 of the first embodiment of the invention depicted in FIG. 1. This frame (not further labeled as a whole) encompasses a front (in terms of direction of travel F) frame part 30b and a rear frame part 30a.

A further special aspect of the second embodiment of the vehicle seat according to the present invention is the fact that display screen 8 (including its two cover parts 28a, 28b) is mounted rotatably about a further center axis Y-Y that extends in the transverse direction of the seat and, in particular, is contained in the frame. This makes it possible, before display screen 8 is optionally pivoted forward once headrest 1 has been removed, to bring display screen 8 with cover parts 28a, 28b into a protected position in which the originally front (windowless) cover part 28a faces away from direction of travel F and—after display screen 8 (inclusive of frame parts 30a, 30b) has been pivoted approximately 90 degrees—upward. This non-use position of display screen device 4 is depicted in FIG. 4.

The non-use position of display screen device 4 can be established even if there is no intention to fold down seatback 20. For example, starting from the use position depicted in FIG. 3, firstly headrest 1 can be removed, then display screen 8 with the two cover parts 28a, 28b can be rotated 180 degrees about center axis Y-Y extending in the transverse direction of the seat, and then the headrest can be put back in place, thus resulting once again in a position similar to that in FIG. 3, except that display screen 8 is protected by front cover part 28b.

The mounting of display screen 8 in frame parts 30a, 30b, which permits a rotation of up to 180 degrees, also advantageously makes it possible, in the use position of display screen device 4 depicted in FIG. 3, to perform an individual adaptation of display screen 8 to the needs of a viewer in the context of a smaller rotation angle, by the fact that an optimum viewing angle can be steplessly set by way of a corresponding rotation. To ensure that display screen 8 does not independently rotate forward or backward away from that angle during vehicle operation, a brake mechanism 31 can be provided for locking, as shown in FIG. 5.

In contrast to display screen 8 and its cover parts 28a, 28b, spring housing part 23, damper housing part 24, and housing part 25 that serves for cable guidance—which also (as already mentioned) constitute a frame part—are immovably (nonrotatably) joined to, in particular interposed between, front frame part 30b and rear frame part 30a. The manner in which assembly, for example fastening with screws 32, can be accomplished is illustrated in FIG. 5 by the unlabeled dot-dash lines.

The invention is not limited to the exemplary embodiments depicted, but instead also encompasses all embodiments of identical function within the meaning of the invention. In particular, for example, the conformation and dimensioning of the parts described may deviate from the embodiments depicted. Or, for example, the upper and lower sides of bottom part 7, headrest 1, and support part 5, depicted respectively as being flat, can be equipped with contours that correspond positively to one another, thereby preventing any mutual relative motion of said parts.

One skilled in the art may moreover provide further features for the technical configuration of a vehicle seat according to the present invention without leaving the context of the invention. For example, it is possible for an infrared remote control also to be provided for display screen device 4, as illustrated by infrared window 33 depicted in FIG. 5.

Instead of the bearing point of brake mechanism 31 depicted in FIG. 5, provision can also be made that display screen 8 could be mounted laterally (to the right and left of braking mechanism 31 that is depicted) in its frame by way of ball joints located in particular in rear cover part 28, and thus could be adapted to different viewing directions; in the context of a pivoting motion about a vertical axis also made possible thereby, one or the other of the two ball joints would need in each case to be snapped out.

In addition, the invention is not limited to the combination of features defined in the independent claims, but instead can also be defined by any other combination of specific features of all the globally disclosed individual features. This means that in principle, practically any individual feature of the independent claims can be omitted or replaced by at least one individual feature disclosed elsewhere in the Application. In this respect, claim 1 is to be understood as merely a first attempt to state an invention, and independent inventive significance is also assigned, as stated, to claims 15 and 24.

Priority application 201 19 410.4, filed Nov. 28, 2001, including the specification, drawings, claims and abstract, is incorporated herein by reference in its entirety.

Priority application 201 08 701.4, filed May 25, 2001, including the specification, drawings, claims and abstract, is incorporated herein by reference in its entirety.

LIST OF REFERENCE CHARACTERS

1 Headrest
2 Retaining rod of 1
3 Receiving space of 1 for 4

4 Display screen device
5 Support part for 4
6 Fastening sleeves for 2
7 Bottom part of 4
7a, 7b Bottom segments
8 Display screen of 4
9 Housing of 4
10 Keypad of 4
11 Bottom surface of 1
12 Passthrough openings for 2 in 7, 7b
13 Connector line
14 Plug connector part in 5
20 Seatback
21 Spring
22 Damper
23 Spring housing part
24 Damper housing part
25 Housing part for cable guidance
26 Base part
27 Adapter
28a Rear cover part for 8
28b Front cover part for 8
29 Window in 28a
30a Rear frame part
30b Front frame part
31 Brake mechanism
32 Screws
F Direction of travel
M1 Torque
M2 Torque
M3 Torque
X-X Pivot axis for 8
Y-Y Rotation axis for 8

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims.

What is claimed is:

1. An entertainment system for a vehicle having a forward direction of travel, comprising:
a display configured to display images to a passenger in the vehicle, the display configured to be mounted to a seat of the vehicle;
wherein the display is configured to pivot with respect to the seat
wherein the display is configured to pivot in the forward direction of travel;
wherein the display is pivotable in the forward direction of travel by generating a first torque and pivotable farther in the forward direction of travel by generating a second torque of greater force than the first torque;
wherein the first torque is about an amount of force equal to acceleration forces produced by a rear collision; and
wherein the second torque is at least four times as great as the first torque.

2. An entertainment system for a vehicle having a forward direction of travel, comprising:
a display configured to display images to a passenger in the vehicle, the display configured to be mounted to the vehicle;
wherein the display is pivotable in the forward direction of travel by generating a first torque and pivoted farther in the forward direction of travel by generating a second torque of greater force than the first torque;
wherein the display is pivotable opposite to the forward direction of travel by a third torque and wherein the second torque requires at least eight times as much force as the third torque.

3. An entertainment system for a vehicle having a forward direction of travel, comprising:
a display configured to display images to a passenger in the vehicle, the display mounted to a seat of the vehicle;
wherein the display is pivotable with respect to the seat;
wherein the display is configured to pivot opposite the forward direction of travel against action of a spring member, the spring member applying a return torque in the forward direction of travel; and
wherein the display is in an upper region of a seatback of the seat.

4. The system of claim 3, wherein the display is rotatable from a first position in which the display faces the forward direction of travel and a second position in which the display faces opposite the forward direction of travel.

5. The system of claim 3, further comprising a multipart frame configured to-receive the display.

6. The system of claim 3, wherein the display is configured to pivot in the forward direction of travel against action of a damper member.

7. The system of claim 3, further comprising a frame having a first side and a second side opposite the first side, wherein the display is visible through the first side and protected by the second side.

8. The system of claim 3, wherein the display is configured to pivot in the forward direction of travel against action of the spring member that provides a torque opposite to the forward direction of travel.

9. The system of claim 3, wherein the display is pivotable in the forward direction of travel by generating a first torque and pivotable farther in the forward direction of travel by generating a second torque of greater force than the first torque.

10. The system of claim 9, wherein the first torque is about an amount of force equal to acceleration forces produced by a rear collision.

11. The system of claim 9, wherein applying the first torque allows the display to be slightly pivoted and applying the second torque allows the display to be pivoted 90 degrees.

12. The system of claim 9, wherein the first torque is generated against action of a damper member and the second torque is generated against action of the spring member.

13. The system of claim 3, wherein the display is configured to pivot along a first axis of rotation and a second axis of rotation.

14. The system of claim 13, wherein the first axis of rotation is perpendicular to the second axis of rotation.

15. The system of claim 13, further comprising a braking mechanism configured to maintain the display in a set position with respect to at least one pivot axis.

16. The system of claim 3, wherein the display is configured to pivot around an axis extending in the transverse direction of the seat of the vehicle in an upper region of the seatback of the seat.

17. The system of claim 16, wherein the display is pivotable in the forward direction of travel against action of the spring member.

18. The system of claim 16, wherein the display is pivotable in the forward direction of travel against action of a damper member.

19. The system of claim 16, wherein the display is pivotable in the forward direction of travel by generating a first torque, pivotable farther in the forward direction of travel by generating a second torque of greater force than the first torque and the display is pivotable opposite to the forward direction of travel.

20. An entertainment system for a vehicle having a forward direction of travel, comprising:
   a display configured to display images to a passenger in the vehicle, the display configured to be mounted to a seat of the vehicle;
   wherein the display is configured to pivot with respect to the seat; and
   wherein the display is configured to pivot opposite the forward direction of travel against action of a spring member and configured to pivot in the forward direction of travel against action of a damper member, the damper member operating separately from the spring member;
   wherein the display is configured to be mounted in an upper region of a seatback of the seat.

21. The system of claim 20, wherein the display is pivotable in the forward direction of travel by generating a first torque and pivotable farther in the forward direction of travel by generating a second torque of greater force than the first torque.

22. The system of claim 21, wherein applying the first torque allows the display to be slightly pivoted and applying the second torque allows the display to be pivoted 90 degrees.

* * * * *